United States Patent
Su et al.

(10) Patent No.: US 10,656,673 B1
(45) Date of Patent: May 19, 2020

(54) KEYBOARD DEVICE

(71) Applicant: Primax Electronics Ltd., Taipei (TW)

(72) Inventors: Chun-Nan Su, Taipei (TW); Chun-Che Wu, Taipei (TW); Tsun-Han Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/394,936

(22) Filed: Apr. 25, 2019

Related U.S. Application Data

(60) Provisional application No. 62/773,545, filed on Nov. 30, 2018.

(51) Int. Cl.
  *G06F 1/16* (2006.01)
(52) U.S. Cl.
  CPC .......... *G06F 1/1624* (2013.01); *G06F 1/1616* (2013.01); *G06F 1/1662* (2013.01)
(58) Field of Classification Search
  CPC .... G06F 1/1624; G06F 1/1616; G06F 1/1669; G06F 1/1662
  See application file for complete search history.

(56) References Cited

U.S. PATENT DOCUMENTS

| | | | |
|---|---|---|---|
| 7,633,745 B2 * | 12/2009 | Sakakibara | G06F 1/1624 312/223.2 |
| 8,310,823 B2 * | 11/2012 | Stoltz | G06F 1/1616 361/679.08 |
| 9,229,485 B2 * | 1/2016 | Ding | G06F 1/1667 |
| 9,740,237 B2 * | 8/2017 | Moore | G06F 1/1618 |
| 2004/0108968 A1 * | 6/2004 | Finke-Anlauff | G06F 1/1616 345/1.1 |

\* cited by examiner

*Primary Examiner* — James Wu
(74) *Attorney, Agent, or Firm* — Kirton McConkie; Evan R. Witt

(57) ABSTRACT

A keyboard device for a computing device is provided. The computing device includes a first system module and a second system module. The keyboard device includes a keyboard module and at least two conductive sliding mechanisms. The keyboard module is installed on the first system module. The keyboard module includes a power supply unit. The power supply unit provides electric power for powering the keyboard module. The keyboard module is movable relative to the first system module through the conductive sliding mechanisms. Each conductive sliding mechanism includes a sliding base and a conductive member. The sliding base is installed on the keyboard module. The conductive member is electrically connected with the first system module and the keyboard module. When the sliding base is moved relative to the conductive member, the keyboard module is moved relative to the first system module.

10 Claims, 7 Drawing Sheets

KEYBOARD DEVICE

CROSS-REFERENCE TO RELATED APPLICATION

This application claims priority to U.S. Provisional Patent Application No. 62/773,545 filed Nov. 30, 2018, the contents of which are incorporated herein by reference.

FIELD OF THE INVENTION

The present invention relates to a keyboard device, and more particularly to a keyboard device with a sliding member, which is installed on a computing device and movable relative to the computing device.

BACKGROUND OF THE INVENTION

Generally, a notebook computer is equipped with a keyboard module. The keyboard module is electrically connected with the internal circuit of the notebook computer through a cable. In accordance with this installing method, the installation position of the keyboard module in the notebook computer is fixed. That is, the keyboard module cannot be moved. Consequently, the position of the keyboard module cannot be adjusted according to the usual practice of the user.

Basically, the conventional notebook computer comprises two flat plates. The two flat plates can be covered by each other. One of the two flat plates is equipped with a display screen. The other flat plate is equipped with the keyboard module, a main board and associated electronic components.

Recently, a dual-screen notebook computer has been introduced into the market in order to expand the applications of the notebook computer. Similarly, the dual-screen notebook computer comprises two foldable flat plates. In comparison with the conventional notebook computer, the flat plate with the physical keyboard module is replaced by a new display screen. The content shown on the additional display screen and the content shown on the original display screen may be different. Alternatively, the additional display screen is an extended image display region.

As mentioned above, the keyboard region of the conventional dual-screen notebook computer has the display screen. Moreover, an image of a virtual keyboard is shown on the display area of the keyboard region of the conventional dual-screen notebook computer. The user may input characters or commands through the virtual keyboard in a touch control manner. However, the touch virtual keyboard does not meet the usual practice of most users of the notebook computer. Especially when a great number of characters are inputted, the touch virtual keyboard is not user-friendly.

Therefore, there is a need of providing an improved keyboard device in order to increase the use convenience.

SUMMARY OF THE INVENTION

The present invention provides a keyboard device. The keyboard device includes conductive sliding mechanisms. The keyboard device is installed on a computing device and movable relative to the computing device. Moreover, the keyboard device is equipped with the power supply unit. When the keyboard device is installed on the computing device, the keyboard device is electrically connected with the computing device through the conductive sliding mechanisms. Consequently, the power supply unit of the keyboard device is charged by the computing device. When the keyboard device is detached from the computing device, the keyboard device is powered by the power supply unit and thus the keyboard device can be normally operated.

The other objects and advantages of the present invention will be understood from the disclosed technical features.

In accordance with an aspect of the present invention, a keyboard device for a computing device is provided. The computing device includes a first system module and a second system module. The keyboard device includes a keyboard module and at least two conductive sliding mechanisms. The keyboard module is installed on the first system module. The keyboard module includes a power supply unit. The power supply unit provides electric power for powering the keyboard module. The at least two conductive sliding mechanisms are arranged between the keyboard module and the first system module. The keyboard module is movable relative to the first system module through the conductive sliding mechanisms. Each conductive sliding mechanism includes a sliding base and a conductive member. The sliding base is installed on the keyboard module. The conductive member is arranged between the sliding base and the first system module. The conductive member is electrically connected with the first system module and the keyboard module. When an external force is exerted on the keyboard module, the sliding base is moved relative to the conductive member by using the conductive member as a fulcrum, and the keyboard module is moved relative to the first system module. The power supply unit is charged by the first system module.

In an embodiment, the sliding base includes a first lateral wall, a second lateral wall and a bottom wall. The first lateral wall and the second lateral wall are opposed to each other. The bottom wall is connected between the first lateral wall and the second lateral wall. An accommodation space is defined by the first lateral wall, the second lateral wall and the bottom wall collaboratively. The conductive member is disposed within the accommodation space. A portion of the conductive member is exposed outside the accommodation space.

In an embodiment, the sliding base further includes a first guided structure and a second guided structure, and the conductive member includes a first guiding groove and a second guiding groove. The first guiding groove and the second guiding groove are opposed to each other. The first guided structure is protruded from the first lateral wall. The second guided structure is protruded from the second lateral wall. The first guided structure and the second guided structure are extended in the directions toward each other. The first guided structure is inserted into the first guiding groove. The second guided structure is inserted into the second guiding groove. While the sliding base is moved relative to the conductive member, the first guided structure and the second guided structure are guided by the first guiding groove and the second guiding groove, respectively.

In an embodiment, the sliding base further includes an engaging block. The engaging block is protruded from the first lateral wall. The engaging block and the first guided structure are located at two opposite sides of the first lateral wall. The keyboard module further includes a coupling recess. The engaging block is received in the coupling recess, so that the sliding base is fixed in the keyboard module.

In an embodiment, the conductive member includes an electric connection part. The electric connection part includes a first electric contact, a second electric contact and a conductive elastic element between the first electric contact and the second electric contact. The first electric contact and the second electric contact are respectively contacted with the first system module and the sliding base in response to an elastic restoring force of the conductive elastic element.

In an embodiment, the conductive member further includes at least one magnetic part, which is arranged beside the electric connection part. The first system module includes at least two conductive positioning mechanisms. The at least two conductive positioning mechanisms are aligned with the at least two conductive sliding mechanisms, respectively. Each conductive positioning mechanism includes a conductive strip and a magnetic element. The conductive strip is arranged between the conductive member and the magnetic element. The first electric contact of the conductive member and the conductive strip are in contact with each other. The at least one magnetic part of the conductive member is detachably and magnetically attracted by the magnetic element of the conductive positioning mechanism. Consequently, the conductive member is positioned on the first system module. When the sliding base is moved relative to the conductive member by using the conductive member as the fulcrum, the keyboard module is correspondingly moved relative to the first system module.

In an embodiment, the keyboard device further includes a wireless communication module. The wireless communication module is installed in the keyboard module. The keyboard device is in wireless communication with the computing device through the wireless communication module.

In an embodiment, the first system module includes a first display surface, the second system module includes a second display surface, and different image contents are shown on the first display surface and the second display surface. The keyboard module is movable relative to the first system module through the conductive sliding mechanisms. Consequently, a portion of the first display surface is covered by the keyboard module.

In an embodiment, the computing device further includes a sensing module, and the sensing module is installed on the first system module to sense a relative position between the keyboard module and the first system module. When the sensing module senses that the relative position between the keyboard module and the first system module is changed from a first position to a second position, an image display region shown on the first display surface is switched from a first region to a second region.

In an embodiment, the power supply unit includes a chargeable battery.

From the above descriptions, the keyboard device of the present invention includes the conductive sliding mechanisms. The keyboard device is electrically connected with the computing device through the conductive sliding mechanisms. When the keyboard device is installed on the computing device, the keyboard device is movable relative to the computing device through the conductive sliding mechanisms. Due to this structural design, the keyboard device can be moved to the desired position according to the usage status. Consequently, the keyboard device is more user-friendly. Moreover, the keyboard device is equipped with the power supply unit. When the keyboard device is detached from the computing device, the keyboard device is powered by the power supply unit. Consequently, the keyboard device can be normally operated. Moreover, when the keyboard device is assembled with the computing device, the power supply unit is charged by the computing device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
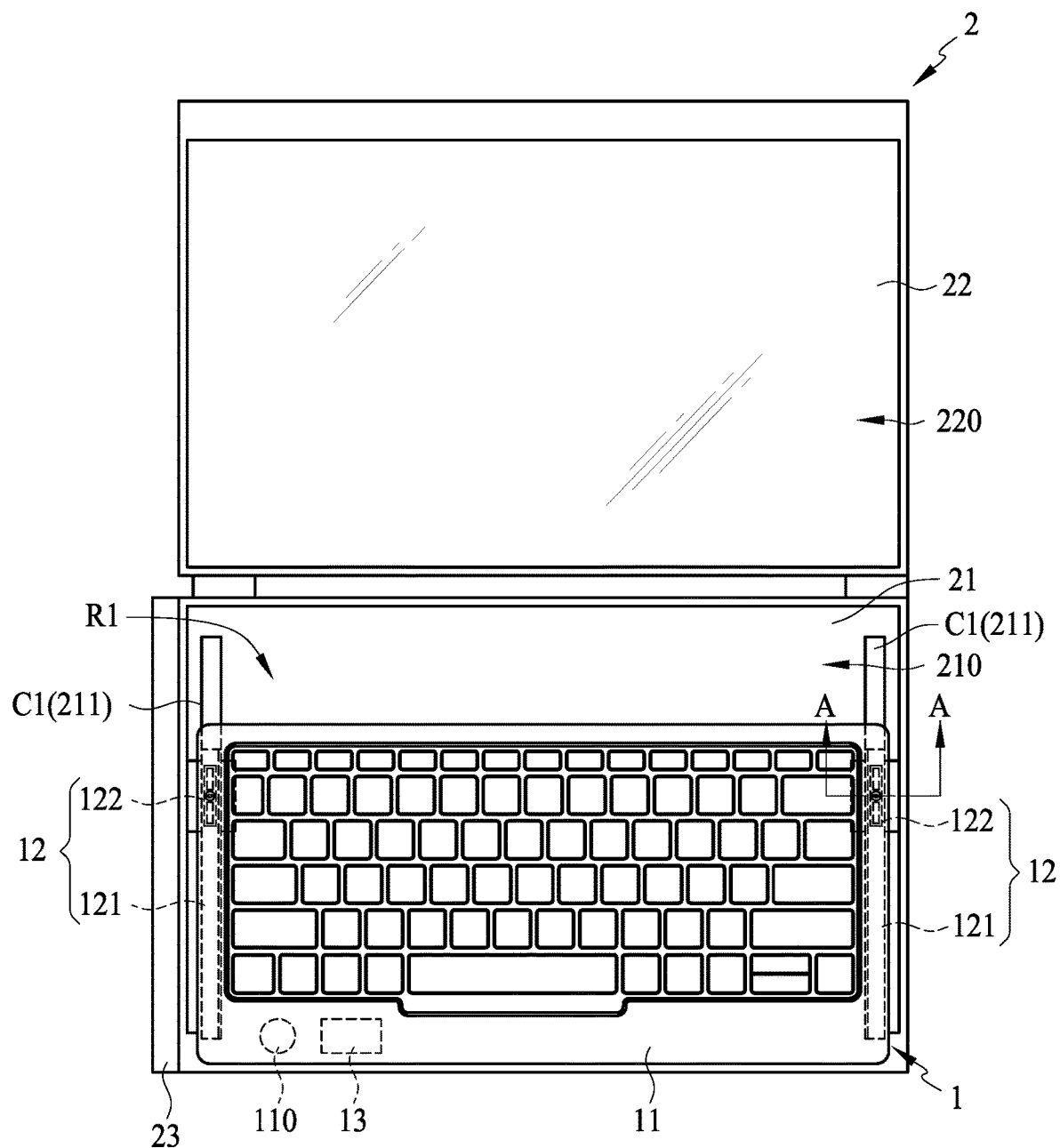
FIG. 1 is a schematic top view illustrating a keyboard device according to an embodiment of the present invention, in which the keyboard dive is installed on a computing device.
Figure 2:
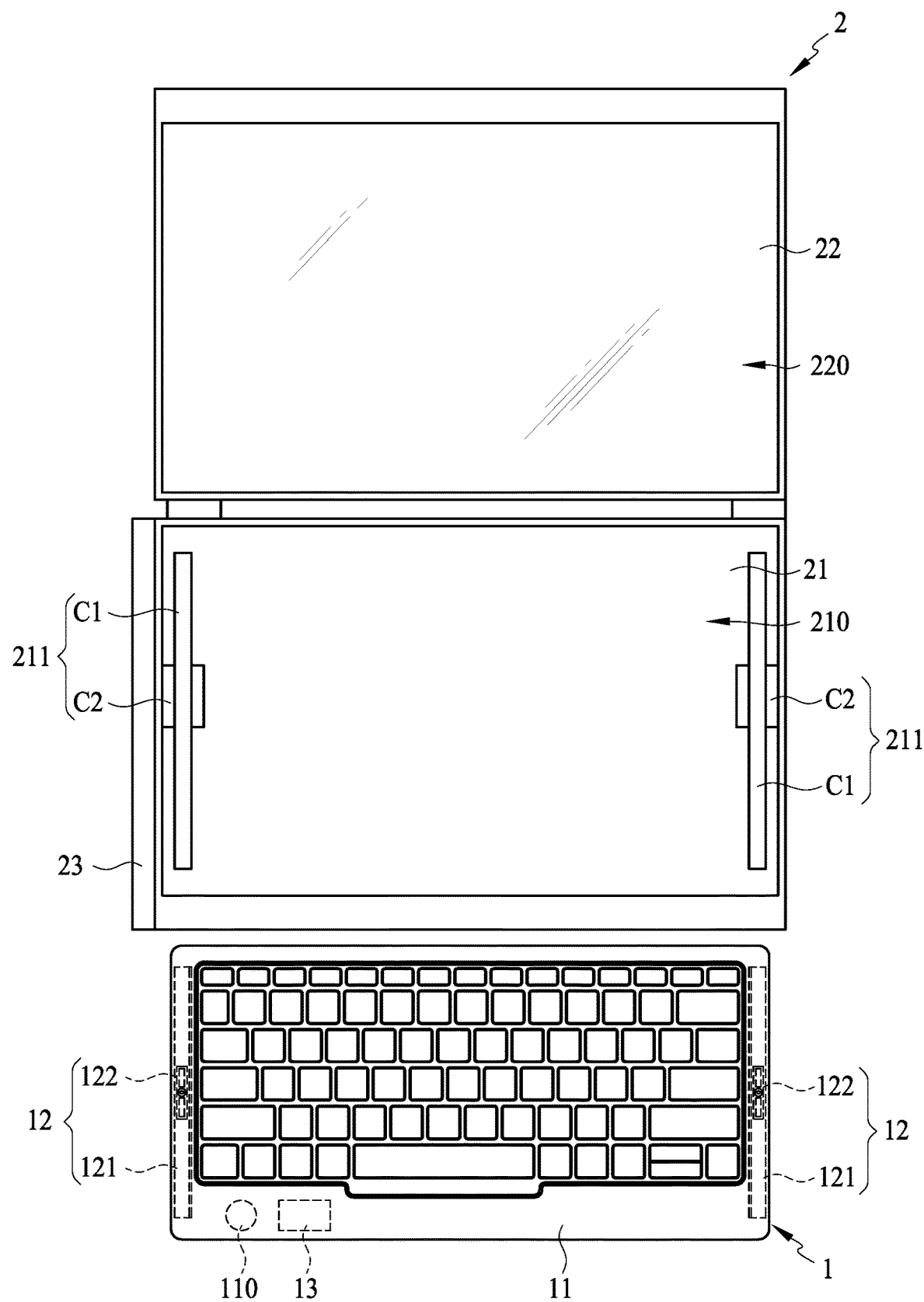
FIG. 2 is a schematic top view illustrating the keyboard device as shown in FIG. 1, in which the keyboard dive is separated from the computing device.
Figure 3:
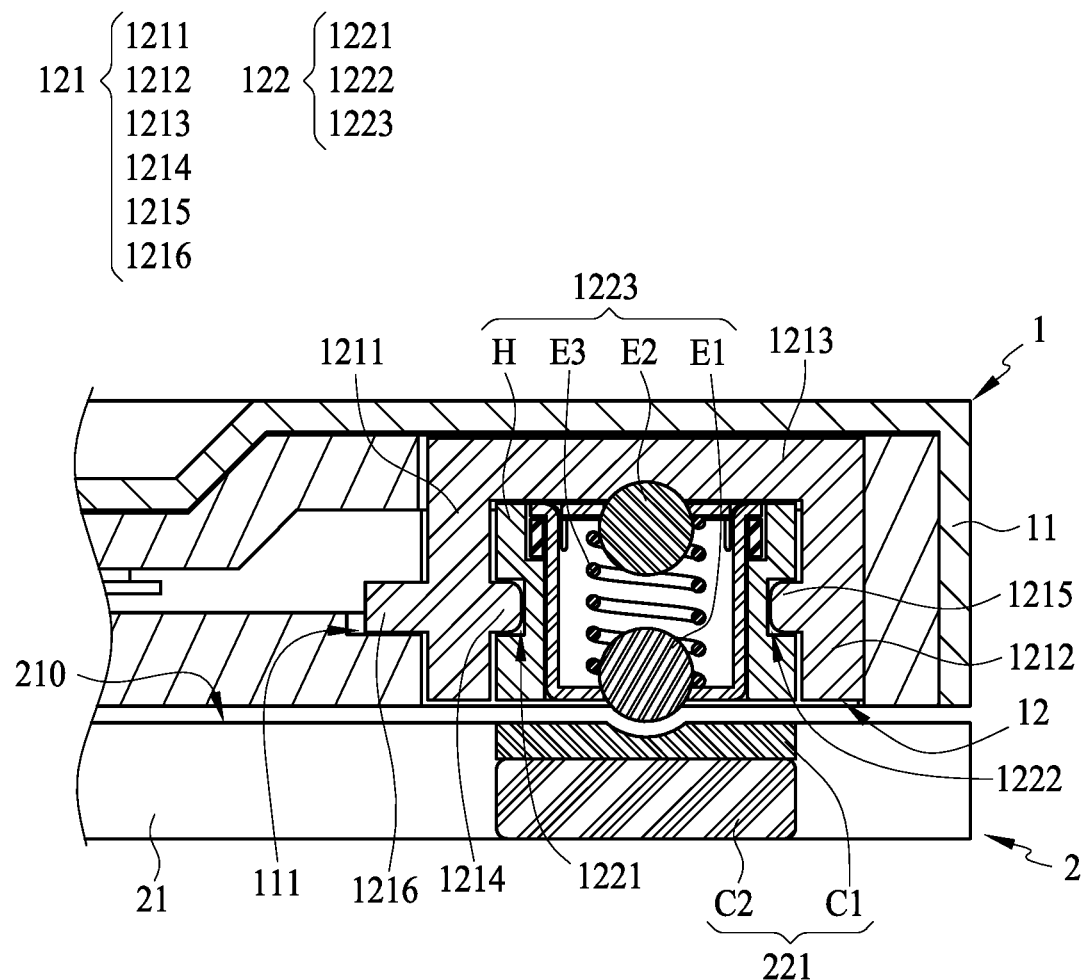
FIG. 3 is a schematic cross-sectional view illustrating the keyboard device as shown in FIG. 1 and taken along the line AA.

Please refer to FIGS. 1, 2 and 3. FIG. 1 is a schematic top view illustrating a keyboard device according to an embodiment of the present invention, in which the keyboard dive is installed on a computing device. FIG. 2 is a schematic top view illustrating the keyboard device as shown in FIG. 1, in which the keyboard dive is separated from the computing device. FIG. 3 is a schematic cross-sectional view illustrating the keyboard device as shown in FIG. 1 and taken along the line AA.

As shown in FIGS. 1 and 2, the keyboard device 1 is applied to a computing device 2. The computing device 2 comprises a first system module 21 and a second system module 22. In this embodiment, the computing device 2 is a dual-screen notebook computer. The first system module 21 comprises a first display surface 210. The second system module 22 comprises a second display surface 220. Different image contents are shown on the first display surface 210 and the second display surface 220. It is noted that the type of the computing device 2 is not restricted. For example, in another embodiment, the computing device 2 is an ordinary single-screen notebook computer.

Please refer to FIGS. 1, 2 and 3 again. The keyboard device 1 comprises a keyboard module 11 and at least two conductive sliding mechanisms 12. The keyboard module 11 is installed on the first system module 21 of the computing device 2. The keyboard module 11 comprises a power supply unit 110. The power supply unit 110 provides electric power for powering the keyboard module 11. Preferably but not exclusively, the power supply unit 110 comprises a chargeable battery. These conductive sliding mechanisms 12 are arranged between the keyboard module 11 and the first system module 21. More particularly, the conductive sliding mechanisms 12 are located at two opposite sides of the keyboard module 11. After the keyboard device 1 and the first system module 21 are combined together, the conductive sliding mechanisms 12 are located outside the first display surface 210 of the first system module 21 (i.e., the non-display area). The keyboard module 11 is movable relative to the first system module 21 through the conductive sliding mechanisms 12, and thus the keyboard module 11 is moved toward or away from the second system module 22. Moreover, a portion of the first display surface 210 of the first system module 21 is covered by the keyboard module 11.

Please refer to FIGS. 1, 2 and 3 again. Each conductive sliding mechanism 12 comprises a sliding base 121 and a conductive member 122. The sliding base 121 is installed on the keyboard module 11. The conductive member 122 is arranged between the sliding base 121 and the first system module 21. Moreover, the conductive member 122 is electrically connected with the first system module 21 and the keyboard module 11. When an external force is exerted on the keyboard module 11, the sliding base 121 is moved relative to the conductive member 122 by using the conductive member 122 as a fulcrum. That is, while the sliding base 121 is moved relative to the conductive member 122, the conductive member 122 is stationary. Moreover, while the sliding base 121 is moved, the keyboard module 11 is correspondingly moved relative to the first system module 21. Since the conductive members 122 are electrically connected with the first system module 21 and the keyboard module 11, the circuit system (not shown) of the keyboard module 11 is electrically connected with the circuit system (not shown) of the first system module 21 through the conductive sliding mechanisms 12. Consequently, the power supply unit 110 of the keyboard module 11 can be charged by the first system module 21.

The structures of the components of the keyboard device 1 will be described in more details as follows.

Figure 4:
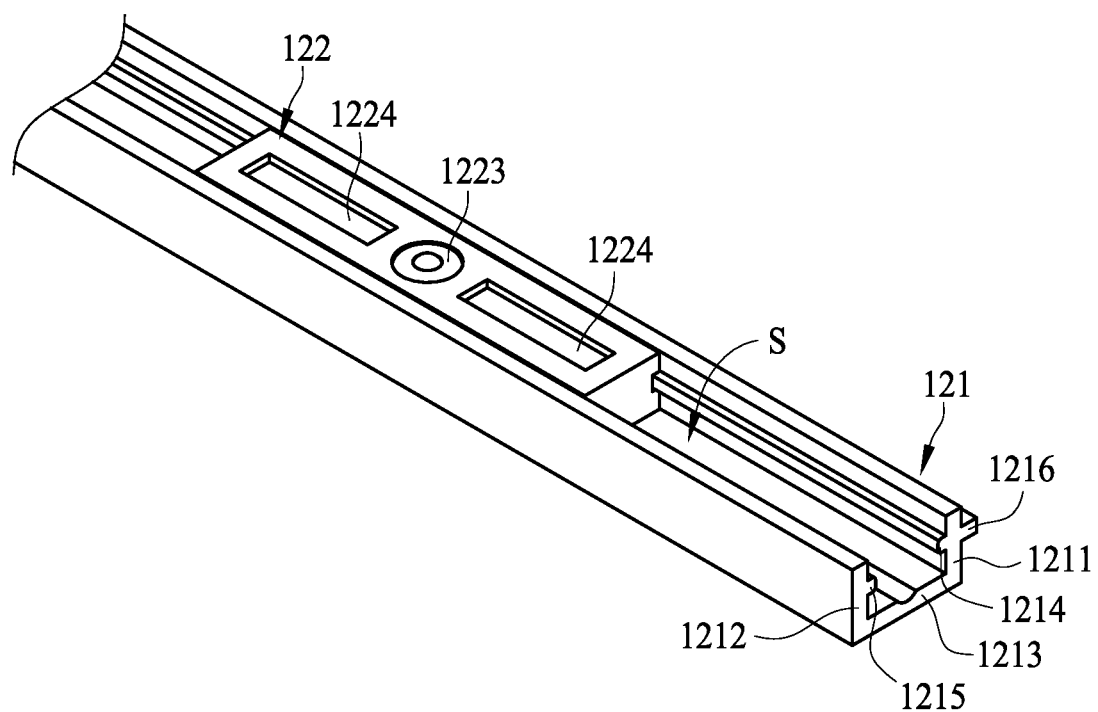
FIG. 4 is a schematic perspective view illustrating the conductive sliding mechanism of the keyboard device as shown in FIG. 1.
Figure 5:
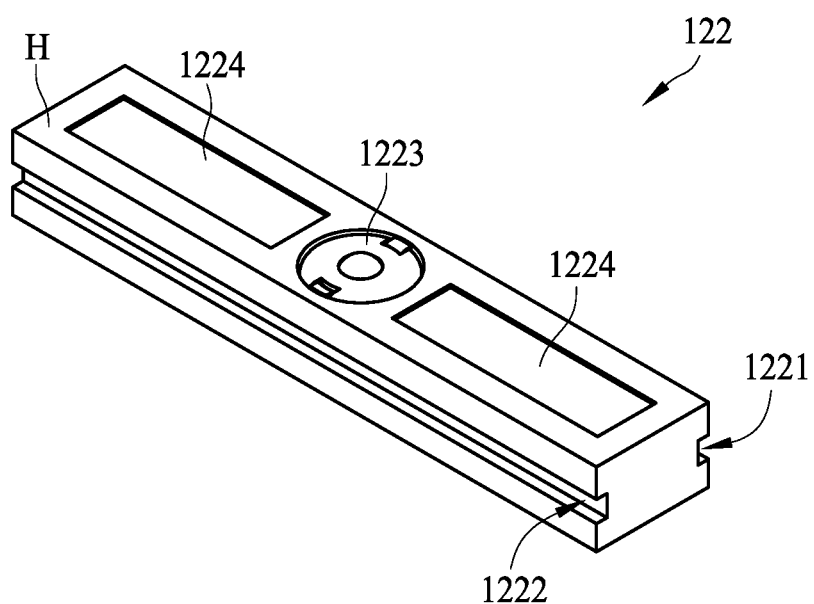
FIG. 5 is a schematic perspective view illustrating the conductive member as shown in FIG. 1 to FIG. 4.

Please refer to FIGS. 4 and 5. FIG. 4 is a schematic perspective view illustrating the conductive sliding mechanism of the keyboard device as shown in FIG. 1. FIG. 5 is a schematic perspective view illustrating the conductive member as shown in FIG. 1 to FIG. 4. As shown in FIGS. 3, 4 and 5, the sliding base 121 comprises a first lateral wall 1211, a second lateral wall 1212 and a bottom wall 1213. The first lateral wall 1211 and the second lateral wall 1212 are opposed to each other. The bottom wall 1213 is connected between the first lateral wall 1211 and the second lateral wall 1212. An accommodation space S is defined by the first lateral wall 1211, the second lateral wall 1212 and the bottom wall 1213 collaboratively. The conductive member 122 of the conductive sliding mechanism 12 is disposed within the accommodation space S of the sliding base 121. A portion of the conductive member 122 is exposed outside the accommodation space S. In this embodiment, the sliding base 121 further comprises a first guided structure 1214 and a second guided structure 1215. Moreover, the conductive member 122 comprises a first guiding groove 1221 and a second guiding groove 1222, which are opposed to each other. The first guided structure 1214 of the sliding base 121 is protruded from the first lateral wall 1211. The second guided structure 1215 is protruded from the second lateral wall 1212. Particularly, the first guided structure 1214 and the second guided structure 1215 are extended in the directions toward each other. Moreover, the first guided structure 1214 is inserted into the first guiding groove 1221 of the conductive member 122, and the second guided structure 1215 is inserted into the second guiding groove 1222 of the conductive member 122. While the sliding base 121 is moved relative to the conductive member 122, the first guided structure 1214 and the second guided structure 1215 are guided by the first guiding groove 1221 and the second guiding groove 1222, respectively. Due to this design, the sliding base 121 and the conductive member 122 are assembled with each other securely, and the sliding base 121 is moved relative to the conductive member 122 stably.

Please refer to FIGS. 3 and 4. The sliding base 121 further comprises an engaging block 1216. The engaging block 1216 is protruded from the first lateral wall 1211. Moreover, the engaging block 1216 and the first guided structure 1214 are located at two opposite sides of the first lateral wall 1211. That is, the first guided structure 1214 is extended in the direction toward the accommodation space S, but the engaging block 1216 is extended in the direction away from the accommodation space S. In this embodiment, the keyboard module 11 further comprises a coupling recess 111. When the sliding base 121 and the keyboard module 11 are assembled with each other, the engaging block 1216 of the sliding base 121 is received in the coupling recess 111 of the keyboard module 11. Consequently, the sliding base 121 is fixed in the keyboard module 11.

In this embodiment, the engaging block 1216 is protruded from the first lateral wall 1211. It is noted that numerous modifications and alterations may be made while retaining the teachings of the invention. For example, in another embodiment, the engaging block 1216 is protruded from the second lateral wall 1212. Alternatively, the two engaging blocks 1216 are protruded from the first lateral wall 1211 and the second lateral wall 1212, respectively.

Please refer to FIGS. 3, 4 and 5 again. The conductive member 122 further comprises an electric connection part 1223. The electric connection part 1223 comprises a first electric contact E1, a second electric contact E2 and a conductive elastic element E3. The conductive elastic element E3 is arranged between the first electric contact E1 and the second electric contact E2. The first electric contact E1 and the second electric contact E2 are respectively contacted with the first system module 21 and the sliding base 121 in response to the elastic restoring force of the conductive elastic element E3. When the keyboard device 1 is installed on the first system module 21, the first electric contact E1 is pushed out of a housing H of the conductive member 122 in response to the elastic restoring force of the conductive elastic element E3. Consequently, the first electric contact E1 is contacted with the first system module 21. When the keyboard device 1 is detached from the first system module 21 and the keyboard device 1 is placed on a table surface, the first electric contact E1 is pushed by the table surface and thus received in the housing H of the conductive member 122. In this embodiment, the sliding base 121 is made of a metallic material with good electric conductivity, the first electric contact E1 and the second electric contact E2 are metallic balls, and the conductive elastic element E3 is a metallic spring.

Please refer to FIGS. 4 and 5. The conductive member 122 further comprises at least one magnetic part 1224. It is noted that the number of the at least one magnetic part 1224 is not restricted. In this embodiment, the conductive member 122 comprises two magnetic parts 1224. The two magnetic parts 1224 are arranged beside two opposite sides of the electric connection part 1223.

Please refer to FIGS. 1, 2 and 3 again. The first system module 21 comprises at least two conductive positioning mechanisms 211. The at least two conductive positioning mechanisms 211 are aligned with the at least two conductive sliding mechanisms 12, which are located at the two opposite sides of the keyboard module 11. Each conductive positioning mechanism 211 comprises a conductive strip C1 and a magnetic element C2. The conductive strip C1 is arranged between the conductive member 122 and the magnetic element C2. The first electric contact E1 of the conductive member 122 and the conductive strip C1 are in contact with each other. That is, the first electric contact E1 is contacted with the conductive strip C1 in response to the elastic restoring force of the conductive elastic element E3 of the conductive member 122. Consequently, the keyboard module 11 and the first system module 21 are electrically connected with each other. Moreover, the magnetic parts 1224 of the conductive member 122 are magnetically attracted by the magnetic element C2 of the conductive positioning mechanism 211. Consequently, the conductive member 122 is positioned on the first system module 21. Meanwhile, the sliding base 121 is movable relative to the conductive member 122 by using the conductive member 122 as a fulcrum, and the keyboard module 11 is correspondingly moved relative to the first system module 21.

As shown in FIGS. 1 and 2, the keyboard device 1 further comprises a wireless communication module 13. The wireless communication module 13 is installed in the keyboard module 11. The keyboard device 1 is in wireless communication with the computing device 2 through the wireless communication module 13. Consequently, when the keyboard device 1 is detached from the computing device 2, the keyboard device 1 can still be used to input commands. Preferably but not exclusively, the keyboard device 1 and the computing device 2 are in wireless communication with each other in a Bluetooth pairing manner.

Figure 6:
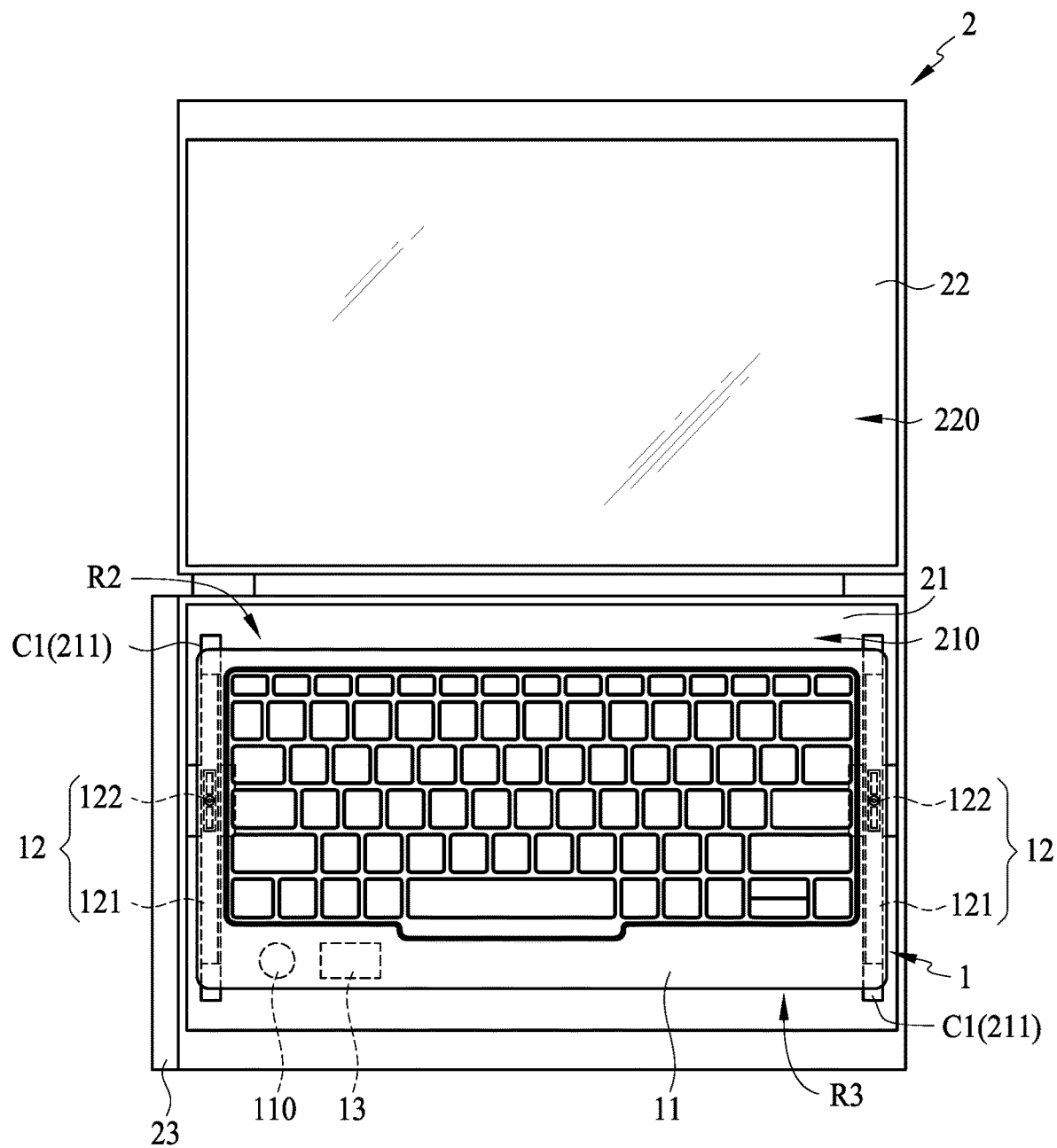
FIG. 6 is a schematic top view illustrating the keyboard module in a specified position relative to the first system module.
Figure 7:
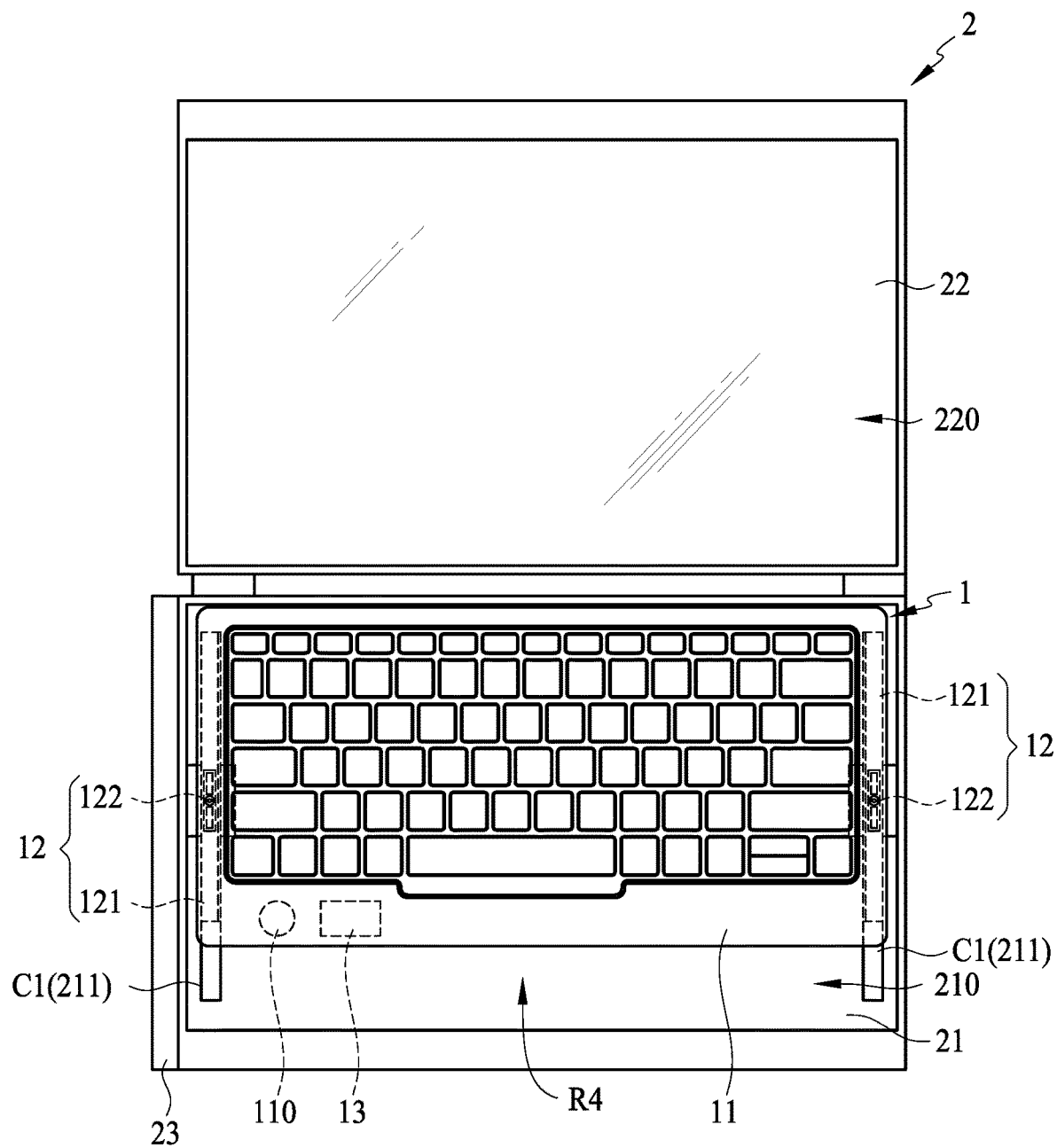
FIG. 7 is a schematic top view illustrating the keyboard module in another specified position relative to the first system module.

As shown in FIGS. 1 and 2, the computing device 2 further comprises a sensing module 23. The sensing module 23 is installed on the first system module 21. For example, the sensing module 23 is a Hall sensor. The sensing module 23 is used for sensing the relative position between the keyboard module 11 and the first system module 21. According to the relative position between the keyboard module 11 and the first system module 21 that is sensed by the sensing module 23, the first system module 21 provides a corresponding displaying setting. For example, when the sensing module 23 senses that the relative position between the keyboard module 11 and the first system module 21 is changed from the position as shown in FIG. 1 to the position as shown in FIG. 6, the image display region shown on the first display surface 210 of the first system module 21 is switched from the region R1 as shown in FIG. 1 to the regions R2 and R3 as shown in FIG. 6. In other words, the image display region shown on the first display surface 210 of the first system module 21 is the region that is uncovered by the keyboard module 11. Similarly, when the sensing module 23 senses that the relative position between the keyboard module 11 and the first system module 21 is changed from the position as shown in FIG. 6 to the position as shown in FIG. 7, the image display region shown on the first display surface 210 of the first system module 21 is switched from the regions R2 and R3 as shown in FIG. 6 to the region R4 as shown in FIG. 7.

From the above descriptions, the keyboard device of the present invention includes the conductive sliding mechanisms. The keyboard device is electrically connected with the computing device through the conductive sliding mechanisms. When the keyboard device is installed on the computing device, the keyboard device is movable relative to the computing device through the conductive sliding mechanisms. Due to this structural design, the keyboard device can be moved to the desired position according to the usage status. Consequently, the keyboard device is more user-friendly. Moreover, the keyboard device is equipped with the power supply unit. When the keyboard device is detached from the computing device, the keyboard device is powered by the power supply unit. Consequently, the keyboard device can be normally operated. Moreover, when the keyboard device is assembled with the computing device, the power supply unit is charged by the computing device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device for a computing device, the computing device comprising a first system module and a second system module, the keyboard device comprising:
   a keyboard module installed on the first system module, wherein the keyboard module comprises a power supply unit, and the power supply unit provides electric power for powering the keyboard module; and
   at least two conductive sliding mechanisms arranged between the keyboard module and the first system module, wherein the keyboard module is movable relative to the first system module through the conductive sliding mechanisms, and each conductive sliding mechanism comprises a sliding base and a conductive member, wherein the sliding base is installed on the keyboard module, the conductive member is arranged between the sliding base and the first system module, and the conductive member is electrically connected with the first system module and the keyboard module, wherein when an external force is exerted on the keyboard module, the sliding base is moved relative to the conductive member by using the conductive member as a fulcrum, and the keyboard module is moved relative to the first system module, wherein the power supply unit is charged by the first system module.

2. The keyboard device according to claim 1, wherein the sliding base comprises a first lateral wall, a second lateral wall and a bottom wall, wherein the first lateral wall and the second lateral wall are opposed to each other, the bottom wall is connected between the first lateral wall and the second lateral wall, and an accommodation space is defined by the first lateral wall, the second lateral wall and the bottom wall collaboratively, wherein the conductive member is disposed within the accommodation space, and a portion of the conductive member is exposed outside the accommodation space.

3. The keyboard device according to claim 2, wherein the sliding base further comprises a first guided structure and a second guided structure, and the conductive member comprises a first guiding groove and a second guiding groove, wherein the first guiding groove and the second guiding groove are opposed to each other, the first guided structure is protruded from the first lateral wall, the second guided structure is protruded from the second lateral wall, and the first guided structure and the second guided structure are extended in the directions toward each other, wherein the first guided structure is inserted into the first guiding groove, and the second guided structure is inserted into the second guiding groove, wherein while the sliding base is moved relative to the conductive member, the first guided structure and the second guided structure are guided by the first guiding groove and the second guiding groove, respectively.

4. The keyboard device according to claim 3, wherein the sliding base further comprises an engaging block, wherein the engaging block is protruded from the first lateral wall, and the engaging block and the first guided structure are located at two opposite sides of the first lateral wall, wherein the keyboard module further comprises a coupling recess, and the engaging block is received in the coupling recess, so that the sliding base is fixed in the keyboard module.

5. The keyboard device according to claim 1, wherein the conductive member comprises an electric connection part, wherein the electric connection part comprises a first electric contact, a second electric contact and a conductive elastic element between the first electric contact and the second electric contact, wherein the first electric contact and the second electric contact are respectively contacted with the first system module and the sliding base in response to an elastic restoring force of the conductive elastic element.

6. The keyboard device according to claim 5, wherein the conductive member further comprises at least one magnetic part, which is arranged beside the electric connection part, wherein the first system module comprises at least two conductive positioning mechanisms, and the at least two conductive positioning mechanisms are aligned with the at least two conductive sliding mechanisms, respectively, wherein each conductive positioning mechanism comprises a conductive strip and a magnetic element, the conductive strip is arranged between the conductive member and the magnetic element, and the first electric contact of the conductive member and the conductive strip are in contact with each other, wherein the at least one magnetic part of the conductive member is detachably and magnetically attracted by the magnetic element of the conductive positioning mechanism, so that the conductive member is positioned on the first system module, wherein when the sliding base is moved relative to the conductive member by using the conductive member as the fulcrum, the keyboard module is correspondingly moved relative to the first system module.

7. The keyboard device according to claim 1, wherein the keyboard device further comprises a wireless communication module, wherein the wireless communication module is installed in the keyboard module, and the keyboard device is in wireless communication with the computing device through the wireless communication module.

8. The keyboard device according to claim 1, wherein the first system module comprises a first display surface, the second system module comprises a second display surface, and different image contents are shown on the first display surface and the second display surface, wherein the keyboard module is movable relative to the first system module through the conductive sliding mechanisms, so that a portion of the first display surface is covered by the keyboard module.

9. The keyboard device according to claim 8, wherein the computing device further comprises a sensing module, and the sensing module is installed on the first system module to sense a relative position between the keyboard module and the first system module, wherein when the sensing module senses that the relative position between the keyboard module and the first system module is changed from a first position to a second position, an image display region shown on the first display surface is switched from a first region to a second region.

10. The keyboard device according to claim 1, wherein the power supply unit comprises a chargeable battery.

\* \* \* \* \*